US012750644B2

(12) United States Patent
Nooren et al.

(10) Patent No.: US 12,750,644 B2
(45) Date of Patent: Sep. 29, 2026

(54) CONTROLLING NETWORK CONNECTIVITY OF AN UNCREWED VEHICLE

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Pieter Nooren, Delft (NL); Jarmo Theodore Wilkens, Malaga (ES)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 19 days.

(21) Appl. No.: 18/844,901

(22) PCT Filed: Mar. 21, 2023

(86) PCT No.: PCT/EP2023/057125

§ 371 (c)(1),
(2) Date: Sep. 6, 2024

(87) PCT Pub. No.: WO2023/186613

PCT Pub. Date: Oct. 5, 2023

(65) Prior Publication Data

US 2025/0220398 A1 Jul. 3, 2025

(30) Foreign Application Priority Data

Mar. 29, 2022 (EP) .................................... 22165033

(51) Int. Cl.
*H04W 4/44* (2018.01)
*H04W 36/30* (2009.01)

(52) U.S. Cl.
CPC ........... *H04W 4/44* (2018.02); *H04W 36/304* (2023.05)

(58) Field of Classification Search
CPC ....... H04W 4/44; H04W 36/304; G08C 17/02
See application file for complete search history.

(56) References Cited

U.S. PATENT DOCUMENTS 11,172,542 B1 * 11/2021 Kalkunte ................ H04W 4/46
2017/0207847 A1 * 7/2017 Jalali ........................ H01Q 1/28
(Continued)

FOREIGN PATENT DOCUMENTS

JP 2009-515487 A 4/2009
JP 4913149 B2 4/2012
(Continued)

OTHER PUBLICATIONS

International Search Report and Written Opinion for International Application No. PCT/EP2023/057125, entitled "Controlling Network Connectivity of an Uncrewed Vehicle," consisting of 6 pages. Date of Mailing: Jun. 21, 2023.
(Continued)

*Primary Examiner* — Calvin Cheung
(74) *Attorney, Agent, or Firm* — Hamilton, Brook, Smith & Reynolds, P.C.

(57) ABSTRACT

The invention relates to an uncrewed vehicle, such as a drone, which is capable of establishing simultaneous data connections to at least two wireless networks. A navigational control system may provide navigation instructions to the uncrewed vehicle via a control data connection established via a first wireless network. The invention further relates to a connectivity control function for controlling network connectivity of the uncrewed vehicle. For that purpose, the connectivity control function may obtain data indicative of a quality-of-service which the first wireless network pro-
(Continued)

vides for the control data connection. If it is determined that a second wireless network provides better quality-of-service, the connectivity control function may send a connectivity control instruction to the uncrewed vehicle to switch the control data connection from the first wireless network to the second wireless network.

15 Claims, 6 Drawing Sheets

(56) References Cited

U.S. PATENT DOCUMENTS

| | | | | |
|---|---|---|---|---|
| 2017/0358223 | A1* | 12/2017 | Priest | G08G 5/56 |
| 2018/0026708 | A1* | 1/2018 | Priest | G08G 5/57 370/316 |
| 2018/0359727 | A1 | 12/2018 | Hori | |
| 2020/0351901 | A1* | 11/2020 | Kahn | H04W 48/18 |
| 2022/0053607 | A1* | 2/2022 | Rice | H04W 72/569 |
| 2023/0284307 | A1* | 9/2023 | Li | B64C 39/024 370/254 |
| 2024/0237089 | A1* | 7/2024 | Karampatsis | H04L 67/141 |

FOREIGN PATENT DOCUMENTS

| | | | |
|---|---|---|---|
| JP | 6335402 | B2 | 5/2018 |
| JP | 6890636 | B2 | 6/2021 |
| JP | 6908853 | B2 | 7/2021 |

OTHER PUBLICATIONS

Amorim, R., et al., "Improving Drone's Command and Control Link Reliability through Dual-Network Connectivity," IEEE 89th Vehicular Technology Conference (VTC2019-Spring), pp. 1-6, (2019).

3GPP TS 23.501 V17.3.0, Technical Specification Group Services and System Aspects; System Architecture for the 5G System (5GS); Stage 2; Release 17 (Dec. 2021).

* cited by examiner

CONTROLLING NETWORK CONNECTIVITY OF AN UNCREWED VEHICLE

This application is the U.S. National Stage of International Application No. PCT/EP2023/057125, filed Mar. 21, 2023, which designates the U.S., published in English, and claims priority under 35 U.S.C. § 119 or 365(c) to European Application No. 22165033.6, filed Mar. 29, 2022. The entire teachings of the above applications are incorporated herein by reference.

TECHNICAL FIELD

The invention relates to an uncrewed vehicle configured to allow remote navigational control by a navigational control system. The invention further relates to a computer-implemented method for use at the uncrewed vehicle. The invention further relates to network node(s) comprising a processor subsystem configured to implement a connectivity control function and to a computer-implemented method for controlling network connectivity of the uncrewed vehicle, and to the navigational control system. The invention further relates to a computer-readable medium comprising data for causing a processor system to perform any of the computer-implemented methods.

BACKGROUND

Drones, or in general Uncrewed or Unmanned Aerial Vehicles (UAVs), are put to use today for many tasks, from observation (e.g., to map fires, road conditions or crop growth), industrial inspection (e.g., of bridges, pipes or building conditions), measurement (e.g., to measure pollutant emissions near stacks) to delivery of goods (e.g., retail products to consumers, medical supplies). The use of UAVs is expected to grow further in the future. Many of the applications of UAVs may require that UAVs operate outside the visual range of their pilot or control facility, the so-called Beyond Visual Line Of Sight (BVLOS) operation. BVLOS introduces stringent requirements on the reliability of the Command and Control (C2) of UAVs. As a result of such stringent requirements, the data connectivity used for C2 information sent to and received from the UAV may need to be very reliable and may need to meet a set of minimum Quality-of-service (QoS) requirements that may for example include minimum requirements for bandwidth, latency, packet loss, jitter, and/or maximum allowed disconnection time.

Flying a UAV under BVLOS operation may also involve a 3rd party UAV Traffic Management (UTM) system that an aviation authority (e.g., FAA, EASA) may require to allow BVLOS activities. The UTM may manage BVLOS activities such as registration and identification, flight planning and authorization, transmission of meteorological information, geo-fencing, and tracking/positioning. The UTM may also verify the data connectivity reliability (e.g., in real-time) along the planned flight path and use information on coverage or connection quality provided by a mobile network.

BVLOS operation typically involves distances between the UAV control unit used by the UAV operator (which may for example be a human, a UTM, a combination of human and UTM, etc.) and the UAV itself that may exceed the reach of Wi-Fi and various point-to-point radio technologies that are used for UAVs at shorter distances.

Cellular mobile networks are natural candidates to provide the connectivity for C2 in BVLOS operations, as cellular mobile networks have a wide coverage. However, despite the reliability of today's mobile networks, the reliability of the data connectivity may still remain a point of concern. For example, a UAV may move to the edges of mobile network coverage where the quality of the connectivity may degrade, which may present a threat to safe operation of the UAV. Such connectivity problems may be avoided (at least partially) by using data connections to multiple mobile networks in parallel. This is a natural approach as there are usually multiple mobile networks in most areas relevant for UAV operations. An exemplary scenario is shown in FIG. 1 where a UAV is shown to be connected via three mobile networks 170, 180, 190. Such simultaneous connectivity to multiple mobile networks may for example be made possible if the UAV is equipped with three radios and with (e)SIMs for the three networks. The UAV control system, which may elsewhere also be referred to as navigational control system, may be connected to each of the three mobile networks, in that it may be reachable via data communication from each of the three mobile networks. In such a scenario, if one or two of the data connections degrade or fail, a third one is still available to carry the C2 information to and from the UAV.

The use multiple mobile networks to improve the reliability of remote control of a UAV is known. For example, reference [1] describes how the reliability of the data transfer to and from a drone can be improved by using data connections to two mobile networks in parallel. In the approach of [1], all data packets are sent twice: once via each of the two connections. Disadvantageously, the improved reliability may come at a significant cost, as by sending all data twice, more of the drone's scarce battery power is consumed. Furthermore, sending the data twice also uses more radio resources in the mobile networks, which may be costly for mobile operators.

While the above refers to uncrewed aerial vehicles, the need to improve the reliability of remote control may also apply to other types of uncrewed vehicles, e.g., ground-based vehicles, drone ships, etc. In addition, while cellular networks may be well-suited for the remote control of uncrewed vehicles, it will be appreciated that also other wireless networks may be used, such as satellite-based networks, RF mesh networks, etc. There may thus be a general need to improve the reliability of remote control of an uncrewed vehicle which is connected via a wireless network to a navigational control system, whilst avoiding the drawbacks of the approach of [1].

REFERENCES

[1] R. Amorim, I. Z. Kovacs, J. Wigard, G. Pocovi, T. B. Sorensen and P. Mogensen, "Improving Drone's Command and Control Link Reliability through Dual-Network Connectivity," 2019 IEEE 89th Vehicular Technology Conference (VTC2019-Spring), 2019, pp. 1-6, doi: 10.1109/VTCSpring.2019.8746579.

SUMMARY

In a first aspect of the invention, an uncrewed vehicle is provided. The uncrewed vehicle may comprise:

- a network interface subsystem configured to establish simultaneous data connections to at least a first wireless network and a second wireless network;

a processor subsystem which may be configured to:

via the first wireless network, establish a control data connection to a navigational control system, wherein the navigational control system may be configured to provide navigation instructions to the uncrewed vehicle via the control data connection;

establish a signaling data connection to a connectivity control function, wherein the connectivity control function may be configured to control network connectivity of the uncrewed vehicle;

wherein the processor subsystem may be further configured to:

via the signaling data connection, receive a connectivity control instruction from the connectivity control function; and if the connectivity control instruction is to switch the control data connection to the second wireless network, effect the switch of the control data connection to the second wireless network.

In a further aspect of the invention, a network node or system of network nodes is provided. The network node or system of network nodes may provide a connectivity control function to control network connectivity of an uncrewed vehicle, wherein the uncrewed vehicle may be configured to establish simultaneous data connections to at least a first wireless network and a second wireless network and to receive navigation instructions from a navigational control system via a control data connection established via the first wireless network. The network node or system of network nodes may comprise:

a network interface to the first wireless network;

a processor subsystem for implementing the connectivity control function, wherein the processor subsystem may be configured to:

obtain data indicative of a quality-of-service which the first wireless network provides or is able to provide in the future for the control data connection;

based on the data, determine if the second wireless network is able to provide a better quality-of-service for the control data connection than the first wireless network; and if it is determined that the second wireless network is able to provide the better quality-of-service, send a connectivity control instruction to the uncrewed vehicle, wherein the connectivity control instruction is to switch the control data connection to the second wireless network.

In a further aspect of the invention, a computer-implemented method is provided for switching data connections at an uncrewed vehicle, wherein the uncrewed vehicle may be configured to establish simultaneous data connections to at least a first wireless network and a second wireless network. The method may comprise:

via the first wireless network, establishing a control data connection to a navigational control system, wherein the navigational control system may be configured to provide navigation instructions to the uncrewed vehicle via the control data connection;

establishing a signaling data connection to a connectivity control function, wherein the connectivity control function may be configured to control network connectivity of the uncrewed vehicle;

via the signaling data connection, receiving a connectivity control instruction from the connectivity control function; and if the connectivity control instruction is to switch the control data connection to the second wireless network, effecting the switch of the control data connection to the second wireless network.

In a further aspect of the invention, a computer-implemented method is provided for controlling network connectivity of an uncrewed vehicle, wherein the uncrewed vehicle may be configured to establish simultaneous data connections to at least a first wireless network and a second wireless network and to receive navigation instructions from a navigational control system via a control data connection established via the first wireless network. The method may comprise:

obtaining data indicative of a quality-of-service which the first wireless network provides or is able to provide in the future for the control data connection;

based on the data, determining if the second wireless network is able to provide a better quality-of-service for the control data connection than the first wireless network; and if it is determined that the second wireless network is able to provide the better quality-of-service, sending a connectivity control instruction to the uncrewed vehicle, wherein the connectivity control instruction is to switch the control data connection to the second wireless network.

In accordance with a further aspect of the invention, a transitory or non-transitory computer-readable medium is provided comprising data representing a computer program. The computer program may comprise instructions for causing a processor system to perform any of the computer-implemented methods.

In accordance with the above measures, an uncrewed vehicle is provided, such as an UAV, an inspection robot, a drone ship, etc. The uncrewed vehicle may be capable of simultaneous connectivity to at least two wireless telecommunication networks, such as terrestrial cellular telecommunication networks ('mobile networks'), satellite-based telecommunication networks, mesh-based radiofrequency (RF) networks, etc. For example, the uncrewed vehicle may be equipped with a network interface subsystem which may comprise two or more radios for establishing the simultaneous connections to the respective wireless networks, or which may comprise a single radio which is capable of maintaining connectivity to two or more wireless networks. Such connectivity may elsewhere also be referred to as 'multi-connectivity', with the adjective 'multi' referring to two or more, e.g., to establishing simultaneous connectivity to two or more wireless networks. In general, the wireless networks may be of a same type, e.g., terrestrial cellular networks, but may also be different in type, e.g., a terrestrial cellular network and a satellite-based network.

The uncrewed vehicle may further comprise a processor subsystem which may be configured to, using the network interface subsystem, establish a control data connection to a navigational control system. Such establishment of a control data connection may involve establishing a data communication session with the navigational control system, for example by establishing a Protocol Data Unit (PDU) session in case the wireless network via which the data communication session is established is a 5G mobile network. The navigational control system may be a known type of navigational control system which may be configured to control the uncrewed vehicle by providing navigation instructions to the uncrewed vehicle via the control data connection. The control by the navigational control system may thus extend to at least navigational control over the uncrewed vehicle. For example, the navigational control system may provide instructions pertaining to a destination or route to be followed by the uncrewed vehicle. It is noted that such instructions may, but do not need to, pertain to real-time control. An example of non-real-time control may be the following: the real-time navigational control may be conducted at least semi-autonomously by the uncrewed vehicle, while the navigational instructions may provide less time critical instructions, e.g., a change of destination, adjustment of flight height of an UAV, etc.

Despite the navigational control exerted by the navigational control system, the uncrewed vehicle may in some embodiments be considered an autonomous vehicle or a semi-autonomous vehicle. In other embodiments, for example in those where the navigational control system controls the uncrewed vehicle in real-time, the uncrewed vehicle may be considered to be a remotely controlled vehicle.

Although the uncrewed vehicle may be simultaneously connected to two or more wireless networks, the processor system of the uncrewed vehicle may be configured to establish and maintain the control data connection principally via one of the wireless networks, meaning that the navigational control instructions may be received via one of the wireless networks during normal operation of the uncrewed vehicle. In some embodiments, the uncrewed vehicle may also send data to the navigational control system, which data may be used by the navigational control system to determine or adjust the navigational control the uncrewed vehicle. Such data may for example comprise flight data or sensor data, which data may also be sent to the navigational control system via the one of the wireless networks. It will be appreciated that although the control data connection may be principally established and maintained via one of the wireless networks, this does not preclude that temporarily, two or more control data connections may be simultaneously active. This may for example occur in transitional phases, for example when switching the control data connection to another wireless network, as also elucidated below, or when it is expected that the control data connection will be switched to another wireless network.

In accordance with the above measures, a connectivity control function is provided which may be accessible to the uncrewed vehicle. For example, the connectivity control function may be a network function which may be reachable by the uncrewed vehicle via one or both of the wireless networks. The connectivity control function may be configured to remotely control the connectivity of the uncrewed vehicle. For that purpose, a signaling data connection may be established between the uncrewed vehicle and the connectivity control function. Via the signaling data connection, the connectivity control function may instruct the uncrewed vehicle to switch the control data connection to another wireless network, and in response, the uncrewed vehicle may switch the control data connection accordingly. To determine whether the control data connection is to be switched, the connectivity control function may obtain data which may be indicative of a quality-of-service (QoS) which the wireless network, via which the control data connection is currently active, provides or is able to provide, for example in the (near) future, for the control data connection. Such data may take various forms but may generally comprise either data which directly relates to the quality-of-service, such as measurement data characterizing available bandwidth or latency to the navigational control system, or data which indirectly indicates or is predictive of the quality-of-service, such as the position of the unmanned vehicle in relation to the wireless network's coverage area. Based on such data, the connectivity control function may estimate whether the other wireless network to which the uncrewed vehicle is connected is able to provide a better quality-of-service for the control data connection, for example currently or in the (near) future, and if so, the connectivity control function may instruct the uncrewed vehicle to switch its control data connection to this other wireless network. Such switching may for example involve the uncrewed vehicle establishing a new control data connection via the other wireless network, and once established, terminating the previous connection.

The above measures may be based in part on the insight that navigational control data may be critical in the operation of an uncrewed vehicle, as degradations in the network or failure to delivery the navigational control data may greatly affect the unmanned vehicle's operation. For example, such degradation or failure may cause an unmanned vehicle to pause or cease the task which it is conducting, such as a delivery task or an inspection task. In some cases, such degradation or failure may even cause the uncrewed vehicle to entirely cease its operation, which may for example result in an UAV being forced to perform an emergency landing, or a semi-autonomous road vehicle being forced to stop alongside of the road. Such degradation or failure may also be detrimental in terms of safety, e.g., to the uncrewed vehicle, but also to humans.

As such, the wireless network via which the control data connection is established should provide sufficient quality-of-service for the navigational control data. Here, 'sufficient' quality-of-service may include the mere ability to establish and maintain the control data connection (which may for example be impaired if the uncrewed vehicle is at the edge or outside of the wireless network's coverage) but also may require the quality-of-service to be above a certain level (e.g., provide a minimum bandwidth, maximum latency, experience no or little packet loss etc.).

While [1] addresses the coverage issue, the approach of [1] requires the navigational control data (in form of C2 data) to be sent via two mobile networks simultaneously, which may consume additional energy and negatively impact the unmanned vehicle's battery level (or energy level of another type of energy source). In addition, the simultaneous transmission of navigational control data may, when taking both mobile networks together, result in an approximately twice as high utilization of radio resources. In accordance with the above measures, the uncrewed vehicle principally maintains one control data connection via one wireless network to the navigational control system, but a connectivity control function is provided which may monitor and/or estimate the quality-of-service experienced by the unmanned vehicle and which may timely instruct the uncrewed vehicle to switch to another wireless network if the quality-of-service drops or is expected to drop below a certain minimal level. There may therefore be no need to, on a continuous or at least regular basis, send and receive the navigational control data simultaneously via two mobile networks. Moreover, when taken together, the utilization of radio resources of the wireless networks may be reduced, e.g., by approximately 50%. This is particularly relevant for uncrewed vehicles which may frequently operate at the edge of mobile radio coverage, for example UAVs which may operate at a height for which the coverage of a mobile network was not optimized. At such edges of mobile radio coverage, radio resources may be relatively sparse, and the utilization of radio resources may be relatively costly for a mobile operator. A reduction in their utilization may thus be especially beneficial.

While in some embodiments, the uncrewed vehicle may maintain simultaneous signaling data connections to the connectivity control function via the respective wireless networks, such a signaling data connection may, compared to the control data connection, be less demanding in terms of quality-of-service. For example, the signaling data connection may not require a particularly high bandwidth or a particularly low latency. Likewise, maintaining a signaling data connection may consume (much) less energy than maintaining a control data connection, as it may only intermittently or sporadically carry significant amounts of data, for example, video data sent by the uncrewed vehicle to assist in navigational control, whilst the control data connection may (semi-)continuously or at least regularly carry control data.

The following embodiments may represent embodiments of the uncrewed vehicle and computer-implemented method performed at the uncrewed vehicle, but may, unless otherwise precluded for technical reasons, also represent embodiments of the network node or system of network nodes providing the connectivity control function and of the corresponding computer-implemented method where the processor subsystem of the network node(s) is configured to perform corresponding step(s).

In an embodiment, the processor subsystem may be configured to send data to the connectivity control function, wherein the data may be indicative of a quality-of-service which the first wireless network provides or is able to provide for the control data connection. The connectivity control function may determine the quality-of-service which is currently experienced or will be experienced by the uncrewed vehicle in the near future in several ways. For example, as elucidated elsewhere, data may be obtained by the connectivity control function which may be indicative of this quality-of-service. Such data may be obtained from the wireless network itself, for example from one or more network functions in a core of the wireless network. Additionally, or alternatively, the uncrewed vehicle may also itself provide data to the connectivity control function which may be indicative of quality-of-service or data that, when used in combination with other data, may be indicative of quality-of-service. Such data may for example include one or more of: positional data indicative of a geolocation of the uncrewed vehicle, route data indicative of a route or destination of the uncrewed vehicle, and network performance data indicative of a network performance of a part of the first wireless network which may be utilized by the control data connection. Either or both the positional data and the route data may be used by the connectivity control function to determine where the uncrewed vehicle is or will be in relation to the coverage area of the wireless network, and thereby estimate whether the quality-of-service is or will be insufficient. For example, on the basis of the positional data and/or the route data, the connectivity control function may determine that the uncrewed vehicle is near an edge of the coverage area, beyond which there will be no coverage. It may also be that the wireless network's performance is unequal across its coverage area, for example due to local capacity limits, e.g., in radio resources or in the backhaul network from radio access points to a core of the wireless network. Also in such examples, the connectivity control function may determine based on the positional data and/or route data whether the uncrewed vehicle will encounter areas with such insufficient capacity. Yet another example of data provided by the uncrewed vehicle may be network performance data, which may more directly express the quality-of-service currently experienced by the uncrewed vehicle, and which data may be measured by the uncrewed vehicle (e.g., by measuring the bandwidth and/or latency).

In an embodiment, the processor subsystem may be configured to obtain the route data from the navigational control system before sending the route data to the connectivity control function. In such an embodiment, the uncrewed vehicle may function as a relay for the route data in that it may obtain the route data from the navigational control system and then send it to the connectivity control function. This may be advantageous as it may not be needed for the navigational control system to directly communicate with the connectivity control function and vice versa. Rather, the uncrewed vehicle, which may already be configured to communicate with each of these entities, may function as a relay. In some embodiments, the route data may also already be obtained by the uncrewed vehicle for its own navigational purposes. In such embodiments, obtaining the route data may not represent an additional step.

In an embodiment, the processor subsystem may be configured to provide quality-of-service requirement data to the connectivity control function, wherein the quality-of-service requirement data may be indicative of a quality-of-service requirement for the control data connection. The uncrewed vehicle may have requirements for the quality-of-service provided by the wireless network for the control data connection. By transmitting those requirements in the form of data to the connectivity control function, the connectivity control function may determine whether the required quality-of-service is or will be met by the first wireless network, and if not, may instruct the uncrewed vehicle to switch to the second wireless network of which it is known, or at least expected, that it is able to meet the required quality-of-service.

In an embodiment, the processor subsystem may be configured to establish a first signaling data connection to the connectivity control function via the first wireless network and a second signaling data connection to the connectivity control function via the second wireless network. The uncrewed vehicle may establish and maintain simultaneous signaling data connections to the connectivity control function. This may enable the uncrewed vehicle to be able to receive connectivity control instructions from the connectivity control function even if one of the signaling data connections is degraded or fails entirely. For example, if the uncrewed vehicle makes use of the first wireless network for its control data connection and the signaling data connection but abruptly loses network connectivity to the first wireless network, the connectivity control function may instruct the uncrewed vehicle via the signaling data connection of the second wireless network to switch the control data connection to the second wireless network. The uncrewed vehicle may thus remain reachable for the connectivity control function even if it loses network connectivity to one of the wireless networks.

In an embodiment, the processor subsystem may be configured to implement the connectivity control function, wherein the signaling data connection may be an internal data connection of the uncrewed vehicle. The connectivity control function may thus be an internal function of the uncrewed vehicle. Alternatively, the connectivity control function may be a network function, for example a network function which is reachable via both the first wireless network and the second wireless network.

In an embodiment, the first wireless network may be a terrestrial cellular network, and the second wireless network may be one of:

another terrestrial cellular network;

a non-cellular wireless network;

a non-terrestrial wireless network

The uncrewed vehicle may maintain simultaneous connectivity to at least two terrestrial cellular networks, but also to diverse types of networks, such as a combination of a terrestrial cellular network and a non-cellular wireless network (e.g., a mesh-based Wi-Fi or RF network) or a non-terrestrial wireless network (e.g., satellite network).

The following embodiments may represent embodiments of the network node or system of network nodes providing the connectivity control function and of the computer-implemented method for performing connectivity control, but may, unless otherwise precluded for technical reasons, also represent embodiments of the uncrewed vehicle and corresponding computer-implemented method where its processor subsystem is configured to perform corresponding step(s).

In an embodiment, the processor subsystem may be configured to refrain from sending the connectivity control instruction to the uncrewed vehicle to switch the control data connection to the second wireless network if the quality-of-service of the first wireless network is determined to be adequate. In such embodiments, even if the second wireless network is determined to provide a better quality-of-service, the instruction to switch may only be sent if the quality-of-service experienced via the first wireless network is inadequate. Such adequacy may for example be determined by checking if a numerical representation of the quality-of-service is above a static or dynamic threshold, while the inadequacy may for example be determined by checking if a numerical representation of the quality-of-service is below a static or dynamic threshold. This embodiment may have the advantage that it may be avoided that the control data connection is too frequently switched between wireless networks, which may be disadvantageous, for example in terms of network overhead.

In an embodiment, the data obtained by the processor subsystem comprises one or more of:

positional data indicative of a geolocation of the uncrewed vehicle;

coverage data indicative of a network coverage of the first wireless network;

route data indicative of a route or destination of the uncrewed vehicle;

network status data indicative of a network status of a part of the first wireless network which is utilized by the control data connection;

network performance data indicative of a network performance of a part of the first wireless network which is utilized by the control data connection.

To be able to determine whether the quality-of-service provided to the uncrewed vehicle for the control data connection is sufficient, the connectivity control function may obtain various data. Such data may for example include, but may not be limited, to the above types of data. It is noted that the network status data and/or the network performance data may be obtained for the wireless network which currently carries the control data connection, e.g., the first wireless network, but also for the other wireless network(s) to which the uncrewed vehicle maintains connectivity, e.g., the second wireless network, but also for wireless networks to which the uncrewed vehicle currently has no connectivity but may in the future establish connectivity with.

In an embodiment, the processor subsystem may be configured to:

obtain further data indicative of the quality-of-service which the second wireless network is able to provide for the control data connection;

compare the data and the further data to determine if the second wireless network is able to provide the better quality-of-service for the control data connection than the first wireless network.

By obtaining data for both the first wireless network and the second wireless network (and possibly for further wireless networks), the connectivity control function is enabled to compare the first wireless network and the second wireless network (and possibly further wireless networks) in terms of quality-of-service to each other and make the decision to switch from the first wireless network to the second wireless network based on this comparison. While it may not be needed to obtain such data for the second wireless network (e.g., if the quality-of-service experienced via the first wireless network is abnormal, the connectivity control function may simply instruct the uncrewed vehicle switch to the second wireless network as the second wireless network is expected to provide a normal quality-of-service), being able to make such a comparison may be advantageous as there may be cases in which the quality-of-service provided by the first wireless network may be below the desired level, but in which the quality-of-service provided by the second wireless network may not be better. In such cases, the connectivity control function may refrain from instructing the uncrewed vehicle to switch control data connectivity to the second wireless network.

In an embodiment, the processor subsystem may be configured to obtain the data from at least one of: the uncrewed vehicle, the navigational control system, and one or more network functions of the first wireless network and/or of the second wireless network. For example, positional data, route data and/or network performance data may be obtained from the navigational control system, while positional data, route data and/or network performance data may be obtained from the uncrewed vehicle, while network status data, network performance data and/or positional data may be obtained from one or more network functions of one or more wireless networks.

In an embodiment, the one or more network functions may comprise one or more of: a performance measurement function (PMF), a network data analytics function (NWDAF) and a policy control function (PCF), for example as specified by 3GPP TS 23.501 V17.3.0 (2021 December); Technical Specification; 3rd Generation Partnership Project; Technical Specification Group Services and System Aspects; System architecture for the 5G System (5GS); Stage 2 (Release 17). For example, the PMF may provide radio access network (RAN) status information for a wireless network, which status information may be indicative of the quality-of-service experienced by the uncrewed vehicle for its control data connection. Another example is the NWDAF, which may provide a network-based estimate of the uncrewed vehicle's position, which may be compared to a wireless network's coverage area to obtain an estimate of the quality-of-service. The NWDAF may additionally or alternatively provide measurements or estimates of the end-to-end performance of the control data connection. Yet another example is that the PCF may send messages about violation of quality-of-service policies; such violations may indicate a sub-optimal or poor quality-of-service.

In an embodiment, the first wireless network may comprise a plurality of radio access points, wherein the data may be specific for and obtainable per radio access point or per network part serving one or more radio access points, and wherein the processor subsystem may be configured to obtain the data associated with a radio access point to which the uncrewed vehicle is connected or is expected to connect. Quality-of-service may vary across the coverage area of a wireless network. For example, the wireless network's performance may be unequal across its coverage area, for example due to local capacity limits, e.g., in radio resources or in the backhaul network from radio access points to a core of the wireless network. By obtaining data which specifically relates to the quality-of-service experienced at or near the uncrewed vehicle's position, a more accurate estimate of the quality-of-service may be obtained, which may be used by the control connectivity function to more timely determine when to switch connectivity from the first wireless network to the second wireless network.

In an embodiment, the processor subsystem may be configured to send the connectivity control instruction to the uncrewed vehicle by sending the connectivity control instruction to the navigational control system for transmittal to the uncrewed vehicle via the control data connection. Instead of establishing a separate signaling data connection to the uncrewed vehicle, the connectivity control function may provide connectivity control instructions to the navigational control system, which navigational control system already has a data connection with the uncrewed vehicle in form of the control data connection. The connectivity control instructions may be carried over this existing control data connection as additional signaling data. This way, a separate signaling connection between the connectivity control function and the uncrewed vehicle may not be needed.

In a further aspect of the invention, a navigational control system is provided which may be configured to navigationally control an uncrewed vehicle by sending navigation instructions via a control data connection to the uncrewed vehicle. The navigational control system may comprise a processor subsystem configured to implement a connectivity control function as defined in this specification. The connectivity control function may thus be included in the navigational control system.

In a further aspect of the invention, a system is provided, which system may comprise an uncrewed vehicle as defined in this specification and a network node or system of network nodes as defined in this specification.

It will be appreciated by those skilled in the art that two or more of the above-mentioned embodiments, implementations, and/or aspects of the invention may be combined in any way deemed useful.

Modifications and variations of any one of the uncrewed vehicle, the connectivity control function, the network node or system of network nodes, the computer-implemented methods, the metadata and/or the computer programs described in this specification, which correspond to the described modifications and variations of another one of these entities, or vice versa, may be carried out by a person skilled in the art on the basis of the present specification.

BRIEF DESCRIPTION OF THE DRAWINGS

These and other aspects of the invention are apparent from and will be elucidated with reference to the embodiments described hereinafter. In the drawings.

Figure 1:
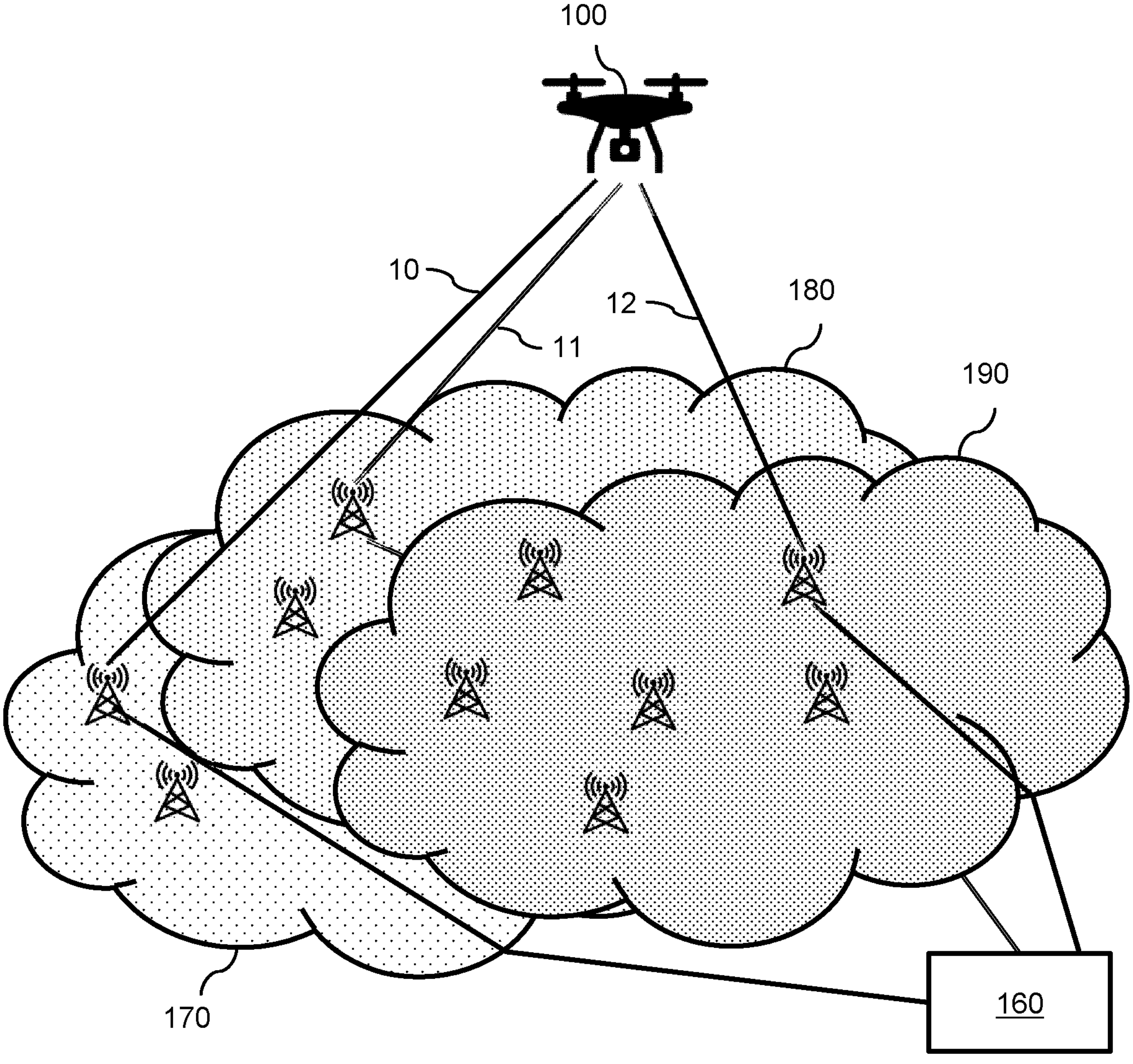
FIG. 1 shows an uncrewed vehicle having three simultaneous control data connections to a navigational control system via respective mobile networks.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

BVLOS beyond visual line of sight
C2 command and control
QoS quality-of-service
UAV uncrewed aerial vehicle
UTM UAV traffic management
1-7 messages/steps in information exchange
10-12 control data connection
20, 21 signaling data connection
30, 31 data exchange
100 uncrewed vehicle
110 radio A
120 radio B
140 connectivity device function
150 connectivity control function
160 navigational control system
170 mobile network A
172 network function(s) in user plane
174 network function(s)
180 mobile network B
182 network function(s) in user plane
184 network function(s)
190 mobile network C
200 uncrewed vehicle
210 first radio
220 second radio
230 processor subsystem
240 data storage
300 processor system providing connectivity control function
310 network interface
320 processor subsystem
330 data storage
400 computer-readable medium
410 non-transitory data
1000 exemplary data processing system
1002 processor

1004 memory element
1006 system bus
1008 local memory
1010 bulk storage device
1012 input device
1014 output device
1016 network adapter
1018 application

DESCRIPTION OF EMBODIMENTS

The following embodiments may be described for an uncrewed vehicle in form of a drone, with a drone being an example of an uncrewed aerial vehicle. The navigational control system is within the context of these embodiments also referred to as a drone control system. Furthermore, since the drone's mode of motion is flight, data which is indicative the drone's position and/or route may be obtained in the form of flight data, while the navigational control data provided to the drone may relate to the drone's flight path. It will be appreciated, however, that the concepts and mechanisms described in this specification equally apply to other types of uncrewed aerial vehicles and to uncrewed non-aerial vehicles. The following embodiments may further refer to wireless networks being 3GPP-types of mobile network, with the drone representing a client device on the 3GPP-type of mobile networks. However, it will be appreciated that the concepts and mechanisms described in this specification may equally apply to any other type of mobile network, or in general to any other type of wireless network.

FIG. 1 shows a drone 100 having three simultaneous control data connections to a drone control system 160, namely a first control data connection 10 via a first mobile network 170, a second control data connection 11 via a second mobile network 180 and a third control data connection 12 via a third mobile network 190. To enable the simultaneous connectivity to multiple mobile networks, the drone 100 may for example be equipped with three radios and with (e)SIMs for the three mobile networks. The drone control system 160, which may be an example of a navigational control system as described elsewhere in this specification, may be connected to each of the three mobile networks 170, 180, 190, in that it may be reachable via data communication from each of the three mobile networks. In the example shown in FIG. 1, if one or two of the control data connections 10-12 degrade or fail, a third control data connection may still be available to carry the navigational control data, or in general command & control (C2) information, to and from the drone 100. However, if the navigational control data is sent via all three mobile networks simultaneously to account for the possibility that one or two of the control data connections may degrade or fail, the disadvantages in terms of energy consumption and radio resource allocation as elucidated in the background section may apply.

In accordance with some of the following embodiments, a new network function may be provided in a mobile network and a new device function may be provided in the drone 100. Briefly speaking, both functions may cooperate to steer and thereby control the establishment and switching of a control data connection, which connection may be established between the drone 100 and the drone control system 160, from one mobile network to another mobile network. Such control of the drone's network connectivity may be based on data which may be obtained by the network function, which data may include but is not limited to data on the performance of the mobile networks and data on the drone's position and/or its planned route. Such types of data may, but do not need to be, real-time data or pseudo real-time data. The network function may be referred to as a connectivity control function (CCF) or as a multi-connectivity control function (MCCF) and may in some embodiments be provided outside of the mobile network(s). The connectivity control function may use the abovementioned data to determine how to make use of the multiple mobile networks to enable the navigational control data from the navigational control system 160 to be delivered reliably to the drone 100. For that purpose, the connectivity control function may be configured to send connectivity control instructions to the new device function in the drone 100 and by way of the instructions control the drone's network connectivity, for example to set-up, use and take down data connections for its navigational control. The new device function may also be referred to as connectivity device function (CDF) or as multi-connectivity device function (MCDF).

Figure 2A:
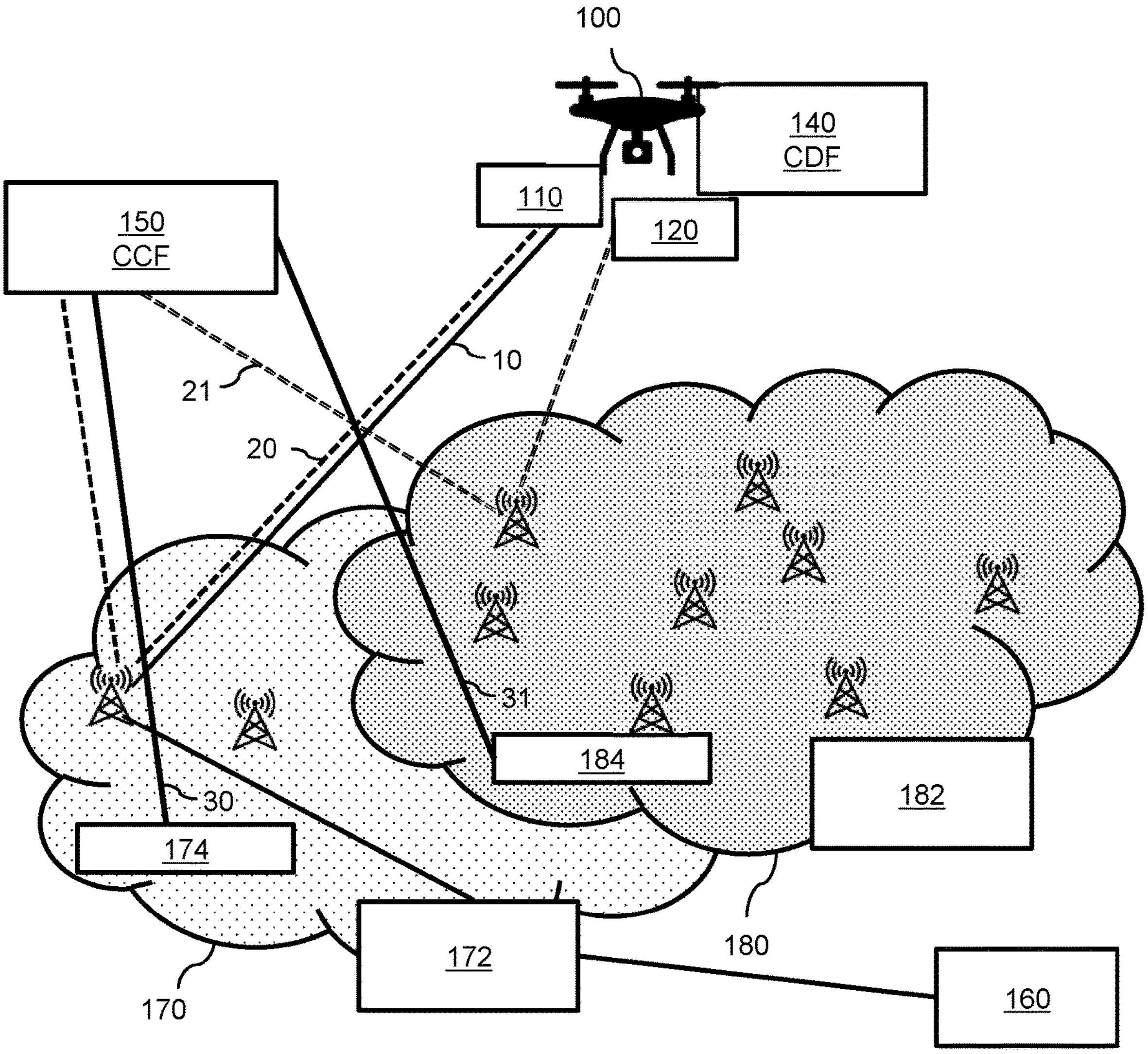
FIGS. 2A and B shows an uncrewed vehicle, after initially having a control data connection to the navigational control system via a first mobile network, being instructed to switch the control data connection to a second mobile network.
Figure 2B:
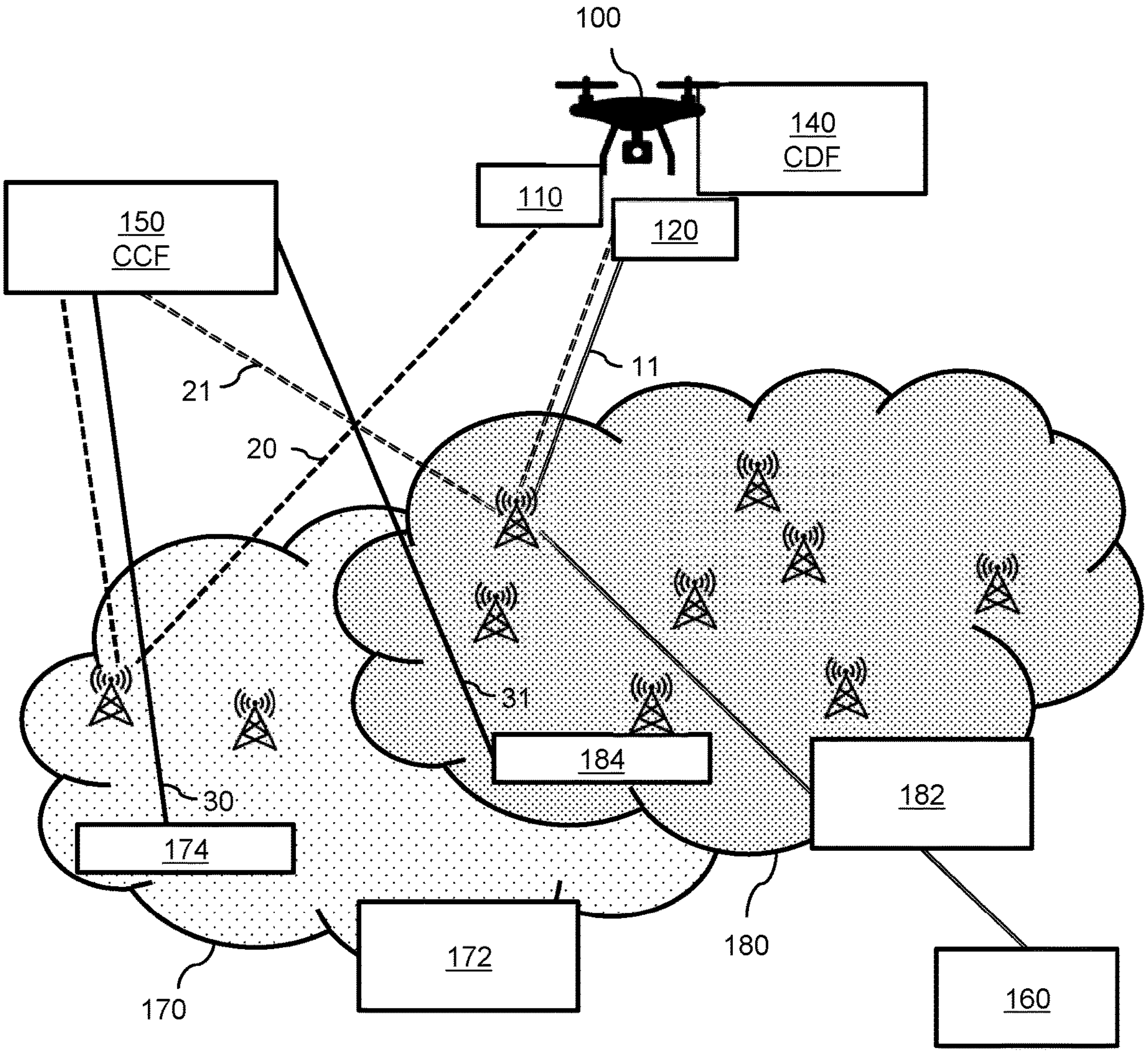

FIGS. 2A and 2B illustrate the functionality of both functions by showing an example in which a drone 100 is at least in part remotely controlled by a drone control system 160. Here, the drone control system 160 may send navigational control data to the drone 100, which navigational control data may contain navigation instructions. During the drone's flight, the drone 100 may also send data, e.g., in (pseudo) real-time, to the drone control system 160, for example by sending data indicative of its position (e.g., as a geolocation), speed, height, its waypoints in time, its planned route to an end-destination, etc. In some examples, the drone 100 may also send additional data feeds such as video data captured by the drone's on-board camera. The navigational control data and other data may be carried between the drone 100 and the drone control system 160 via a data connection carried by a mobile network. In 4G networks, this data connection may for example be a Packet Data Protocol (PDP) context, while in 5G networks, this data connection may be a Protocol Data Unit (PDU) session. It will be appreciated that such a data connection may also take any other suitable form, which form may be specific to the type of wireless network. In this specification, the data connections that carry the navigational control data, for example in the form of or as part of C2 information, may be referred to as control data connections. It will be appreciated that such control data connections may also carry other data besides control data to and from the drone 100, for example the flight data or sensor data of the drone 100, or in general any user plane data sent to and from the drone 100. The control data connections are indicated by solid-colored lines 10, 11 in FIGS. 2A and 2B and may run from the drone 100 via a radio access point of a mobile network and a network function 172, 182 in the user plane of the mobile network to the drone control system 160. A non-limiting example of a network function in the user plane of the mobile network is a 5G User Plane Function (UPF).

With continued reference to FIG. 2A, the drone 100 may be capable of establishing simultaneous connections to the two mobile networks 170, 180, which mobile networks are in the following also referred to as a first mobile network 170 and a second mobile network 180. To support simultaneous connections to two mobile networks, the drone may be equipped with two radios 110, 120, or may have one radio which is capable of such simultaneous connections. Here, the term 'radio' may be short for radio communication system, which may be a hardware radio communication system (e.g., based on mixers, filters, amplifiers, modulators/demodulators, detectors, antennas) or a software radio communication system (also referred to as software-defined radio) or a combination of a hardware and a software-based system.

In addition to the control data connection, signaling data connections may be established between the connectivity control function 150, henceforth also referred to as the MCCF, and the device function 140, henceforth also referred to as the MCDF. The signaling data connections may be separate from the control data connection, and are shown by dashed lines 20, 21 in FIGS. 2A and 2B. These signaling data connections may also be referred to as (Multi)-Connectivity Control Connections (CCCs or MCCCs) as they may pertain to the control of the connectivity of the drone 100 in relation to the multiple mobile networks. Such signaling data connections may, as the control data connections, be implemented in various ways, for example as PDP contexts in 4G networks or as PDU sessions in 5G networks or in any other form.

The CCF 150 may further be connected to one or more network functions 174, 184 in the respective mobile networks 170, 180 via respective data connections 30, 31. Non-limiting examples of such network functions include, but are not limited to, network functions in the control plane such as an Application Function (AF) and/or a Network Exposure Function (NEF), in the respective mobile network. In some embodiments, the network functions may comprise one or more network management functions. From the network functions 174, 184, the CCF 150 may receive data on for example the respective mobile network's radio coverage, for example on cell level, and/or end-to-end performance metrics (e.g., of a network slice allocated by a respective mobile network for traffic to and from the drone). Such data may be sent by the network functions 174, 184 to the CCF 150 using for example request-response or publish-subscribe data communication mechanisms.

In some embodiments, before the drone's operation, e.g., before its flight takes place, the CDF 140 may send data to the CCF 150, which data may for example include the drone's planned route to its end-destination, waypoints in time and/or the QoS requirements for the drone's control data connections (e.g., requirements in terms of bandwidth, latency, packet loss, jitter, maximum allowed disconnection time, etc.). During the flight, the CCF 150 may receive the data from the CDF 140 as elucidated previously with reference to FIGS. 2A and 2B. Based on the information received from the CDF 140 and/or the network functions 174, 184, the CCF 150 may determine how to optimally use the mobile networks 170, 180 to provide optimal connectivity for the control data connection of the drone 100. For that purpose, the CCF 150 may for example use the drone's current positional data to determine the radio coverage in corresponding cells of each mobile network and thereby determine whether the drone 100 is well within a mobile network's coverage area or rather at an edge of the coverage area. This way, the CCF 150 may estimate whether a mobile network provides sufficient quality-of-service for the control data connection, for example now and/or in the future. Accordingly, the CCF 150 may determine which mobile network is most optimal for the control data connection, e.g., in terms of quality-of-service provided for the control data connection, and if needed, instruct the CDF 140 via the signaling data connection to establish the control data connection via said mobile network. If the drone 100 is currently connected to another mobile network, such instructions may explicitly or implicitly instruct the drone 100 to switch to the more optimal mobile network. FIGS. 2A and 2B illustrate such switching by the control data connection 10 being in FIG. 2A established via the first mobile network 170 and in FIG. 2B being switched using the drone's CDF 140 to the second mobile network B 180.

In this respect, it is noted that while the control data connection 10 between the drone 100 and the drone control system 160 may be dynamically switched between mobile networks as described above, the drone control system 160 may in some embodiments also be permanently or semi-permanently connected to the user plane functions of multiple networks simultaneously, for example in embodiments where the drone control system 160 may serve multiple drones simultaneously and where some drones may be connected to the first mobile network 170 and others to the second mobile network 180. For example, such a permanent or semi-permanent connection may be carried via an N6 interface between the mobile network and a thereto connected data network to which the drone control system 160 may be connected. The (semi-) permanent connectivity of the drone control system 160 to the user plane functions of several mobile networks simultaneously is however not shown FIGS. 2A and 2B.

In the embodiments described with reference to FIGS. 2A and 2B, the drone 100 may establish signaling data connections 20, 21 via each of the two mobile networks 170, 180 simultaneously, or in general, via each mobile network to which the drone 100 is connected. However, this is not a limitation, in that the signaling data connection may also be established and maintained via only one mobile network. Nevertheless, it may be preferred to maintain at least two signaling data connections simultaneously so as to increase the reliability of the communication between the CCF 150 and the CDF 140. However, in embodiments where the drone 100 is configured to establish and maintain network connectivity to three or more mobile networks simultaneously, it may not be needed for each mobile network to carry a signaling data connection. In such embodiments, the CCF 150 may establish and/or switch signaling data connections between mobile networks in a similar manner as the MCCF may establish and/or switch control data connections between mobile networks.

In general, the CCF 150 may obtain data indicative of a quality-of-service which a first mobile network provides or is able to provide, for example in the (near) future, for the control data connection, and based on the data, determine if a second mobile network is able to provide a better quality-of-service for the control data connection than the first mobile network. If this is expected to be the case, that is, if the CCF 150 determines that the second mobile network is able to provide a better quality-of-service than the first mobile network, the CCF 150 may send a connectivity control instruction to the drone's CDF 140 to switch the drone's control data connection to the second mobile network. Here and elsewhere, the term 'better' may refer to the quality-of-service being improved in at least one aspect, e.g., by providing a higher bandwidth or a lower latency, etc. It will be appreciated that a better quality-of-service may, but does not need to, involve the quality-of-service being improved in several aspects simultaneously, e.g., a higher bandwidth and lower latency. It is further noted that the mere presence of network service and the reliability of the control data connection via a wireless network, for example as measured in terms of packet loss, maximum delay, maximum jitter, maximum connectivity interruption, etc., are both aspects of the quality-of-service. Furthermore, the determining of the quality-of-service may in general comprising measuring or obtaining measurements of quality-of-service relevant metrics but may also involve performing predictions. For example, such predictions may take into account a planned route of the uncrewed vehicle and data on the coverage area of a wireless network to obtain a prediction of QoS along a planned route of the drone 100, and thereby a QoS prediction for the (near) future.

As elucidated elsewhere, the data on which the CCF 150 may base its determination may take various forms and may be obtained from various sources, including but not limited to the types of data elucidated earlier with reference to FIGS. 2A and 2B, such as the pre-flight and/or real-time data received from the drone 100, the data received from the network functions 174, 184 and/or data received from the drone control system 160. Such data may in general pertain to the currently experienced quality-of-service, but alternatively or additionally to the quality-of-service expected for the future, e.g., within a given timeframe. For example, route data obtained from the drone 100 may indicate that the drone is expected to leave the first mobile network's coverage area within 30 seconds, which may prompt the CCF 150 to instruct the drone 100 to timely switch to the second mobile network.

Figure 3:
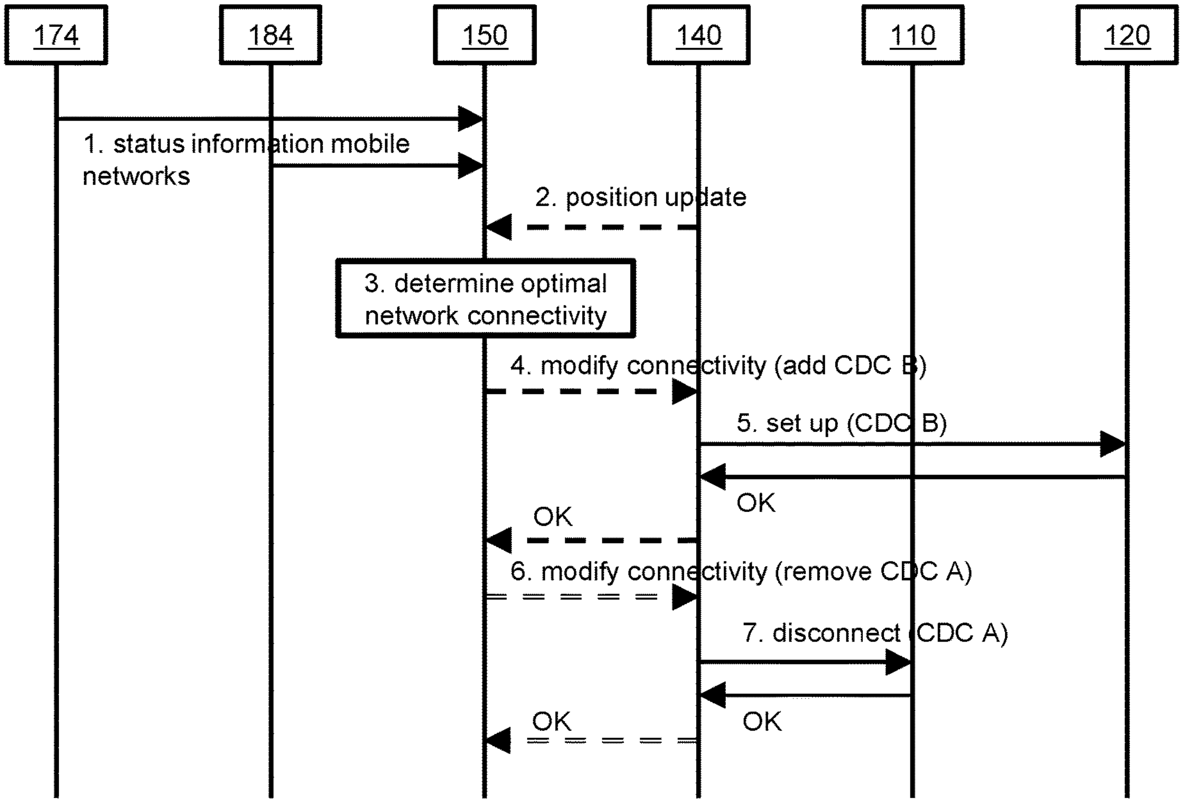
FIG. 3 shows an information exchange by which the control data connection to the navigational control system is switched to the second mobile network.

FIG. 3 relates to the example shown in FIGS. 2A and 2B, in that it shows an information exchange by which the control data connection to the navigational control system 160 may be switched from a first mobile network to a second mobile network. FIG. 3 shows as entities the network function(s) 174 in the first mobile network, the network function(s) 184 in the second mobile network, the CCF 150, the CDF 140 in the drone and the drone's radios, namely a first radio 110 and a second radio 120. Furthermore, it is assumed that at the start of the information exchange of FIG. 3, the drone initially has a control data connection via the first mobile network and that there are simultaneous signaling data connections via the first mobile network and the second mobile network. For ease of reference, this first mobile network may in the following and elsewhere also be referred to as mobile network A, or in short as network A, while the second mobile network may in the following and elsewhere also be referred to as mobile network B, or in short as network B.

The information exchange in FIG. 3 may involve the following steps, which steps may correspond to respectively numbered arrows in FIG. 3. Here, dashed arrows may indicate communication via signaling data connections.

1. 'Status information mobile networks': the CCF 150 may receive information on the status of the individual mobile networks from each of the network functions 174, 184. This step may precede the drone's flight or occur during flight.
2. 'Position update': the CDF 140 may send the drone's current position to the CCF 150 via the signaling data connection established via network A.
3. 'Determine optimal network connectivity': The CCF 150 may determine, during the flight and for example based on the drone's updated position, based on the information on network coverage and/or based on end-to-end performance metrics received from the network functions 174, 184, that the current control data connection (CDC) of the drone via network A may deteriorate or fail in the (near) future. The CCF 150 may further determine that the drone may be better served by a control data connection via network B to meet the quality-of-service requirements pertaining to the control data connection.
4. 'Modify connectivity (add CDC B)': The CCF 150 may instruct the CDF 140 to set up a new control data connection to network B (also in short referred to as 'CDC B'). Such instruction(s) may be sent by the CCF 150 through either the signaling data connection established via network A or via network B or via both networks.
5. 'Set up (CDC B)': In response to the instruction(s), the CDF 140 may set up the new control data connection via network B by sending instructions to the drone's second radio 120.
6. 'Modify connectivity (remove CDC A)': After the control data connection to network B is successfully set up, the CCF 150 may instruct the CDF 140 to disconnect the control data connection previously established via network A through either the signaling data connection established via network A or via network B or via both.
7. 'Disconnect (CDC A)': In response to the instruction(s) sent by the CCF 150, the CDF 140 may disconnect the control data connection via network A by sending instructions to the drone's first radio 110.

The following discusses various optional and/or alternative aspects to the embodiments described or claimed in this specification, which aspects may be combined in any manner unless precluded for technical reasons.

In some embodiments, the connectivity control function may receive route data of the uncrewed vehicle, for example from the connectivity device function on the uncrewed vehicle. It is noted that the uncrewed vehicle may itself receive the route data from the navigational control system. The uncrewed vehicle's route may be entered into an UAV Traffic Management (UTM) system and shared by the UTM with the navigational control system. For that purpose, the navigational control system may be connected to the UTM or may be part of the UTM or may represent the UTM.

In some embodiments, before an operation of the uncrewed vehicle, e.g., before a flight of a drone, the connectivity control function may determine whether at least one or a combination of wireless networks meets the quality-of-service requirements for and during the complete operation of the uncrewed vehicle. This may be determined by the connectivity control function based on data which may include, but not be limited to, the uncrewed vehicle's planned route to its end-destination, waypoints in time and/or the quality-of-service requirements for the uncrewed vehicle's control data connections. The connectivity control function may send a message to the connectivity device function with a confirmation if the quality-of-service requirements can be met, and if not, the connectivity control function may be configured to provide information on the locations along the route with inadequate quality-of-service.

In some embodiments, additional signaling data connections via further mobile networks may be setup by the connectivity device function at the instruction of the connectivity control function. Accordingly, not all signaling data connections used during an uncrewed vehicle's operation may always be present. Rather, signaling data connections may be dynamically set up during the operation of the uncrewed vehicle.

In embodiments involving 5G and similar types of mobile terrestrial cellular networks, signaling data connections may be implemented using Non-Access Stratum (NAS) signaling. Such NAS signaling may, from the perspective of the mobile network, represent data communication in the control plane.

In some embodiments, the connectivity control function may be triggered to instruct the device control function to switch to a different mobile network for its control data connection due to a network degradation, e.g., caused by radio interference. In some embodiments, the change in connectivity may be triggered by a decrease of the network performance measured at the navigational control system. The navigational control system may inform the connectivity control function thereof, for example via the connectivity device function of the uncrewed vehicle or directly. In some embodiments, the change in connectivity may be triggered by information provided by the navigational control system. For example, the navigational control system may have historically measured quality-of-service information of prior operations of uncrewed vehicles which may be predictive of a decrease in quality-of-service experienced during a current operation, or the navigational control system may predict the quality-of-service based on its own data analytics capabilities of end-to-end user application performance (with the user application being in this context the uncrewed vehicle's navigational control).

In some embodiments, the connectivity control function may be implemented by a Mobile Virtual Network Operator (MVNO) that uses several underlying mobile networks. The connectivity control function may also be implemented as an Application Function (AF) in a mobile network. In general, the connectivity control function may be instantiated in each of the mobile networks, with there being interconnections between the different instances to a prevent single point of failure. The different connectivity control functions may continuously or regularly update each other regarding the relevant network status parameters (e.g., coverage of uncrewed vehicle route, end-to-end performance of the uncrewed vehicle's control data connection, performance of network slices that carry the control data connection, etc.).

In some embodiments, the connectivity control function may be implemented on the uncrewed vehicle, together with connectivity device function, for example as one connectivity control function. In some embodiments, the connectivity control function may communicate with the connectivity device function via the navigational control system. In such embodiments, the signaling data connection may be part of the control data connection, in that the control data connection may be used to transmit the signaling data to and from the uncrewed vehicle. In some embodiments, the connectivity control function may be part of the navigational control system or UTM.

In some embodiments, data indicative of the quality-of-service experienced by the uncrewed vehicle may be obtained as radio access network (RAN) status information from a Performance Measurement Function (PMF) in a user plane function (UPF). In some embodiments, such RAN status information may be obtained from the Network Data Analytics Function (NWDAF) or from messages from the PCF about violation of quality-of-service policies. The RAN status information may provide status information at or approximately at cell level or at end-to-end (e.g., network slice) level.

In some embodiments, the connectivity control function may receive data which may be indicative of the uncrewed vehicle's position from the network function(s). Such data may for example be obtained from the NWDAF and may serve as a backup if the uncrewed vehicle fails to share its position (e.g., during a GPS outage) or may be used to complement the positional data shared by uncrewed vehicle. In some embodiments, the connectivity control function may obtain data indicative of the current or of a predicted end-to-end performance of the control data connection from the NWDAF. Here and elsewhere, the term 'end-to-end performance' may refer to the network performance experienced for the control data connection from one end (e.g., the uncrewed vehicle) to another (e.g., the navigational control system).

In some embodiments, at least one of the wireless networks may be a non-cellular wireless network and/or a non-terrestrial wireless network. Examples of such wireless networks include but are not limited to aerial networks via satellite(s) or via high-altitude platform(s). A combination of terrestrial cellular wireless networks and non-cellular and/or non-terrestrial wireless networks may for example be used when terrestrial cell towers of available mobile networks may not fulfill the QoS requirements.

It is noted that in general, any device function or network function described in this specification may be implemented as a system or a subsystem of an entity. For example, the connectivity device function may be implemented by a processor subsystem of the uncrewed vehicle. In such embodiments, the connectivity device function may not be explicitly discernable as a function. Likewise, any system or subsystem described in this specification may be implemented as a function. For example, the navigational control system may be implemented as a network function.

With respect to the uncrewed vehicle's connectivity, it is noted that the uncrewed vehicle may comprise a network interface subsystem, which subsystem may comprise several radios to simultaneously connect to different wireless networks. However, in other embodiments, the network interface subsystem may comprise a single radio that supports a multi-connectivity/registration to multiple wireless networks.

In general, the uncrewed vehicle may function as a client device for a mobile network, such as a 3GPP-type of mobile network. In such cases, the uncrewed vehicle may be considered as User Equipment (UE) or as a combination of UEs of the mobile network. Accordingly, in some embodiments, the uncrewed vehicle may function or be configured as one UE, while in other embodiments, the uncrewed vehicle may function or be configured as several UEs. For example, the uncrewed vehicle may be configured as one UE with a set of credentials and UE identifier. In such embodiments, the uncrewed vehicle may comprise two radios but only one UE route selection policy (URSP), one subscriber identity module (SIM) and one instance of other UE logic (UEL). Alternatively, the uncrewed vehicle may be configured as two UEs each with their own set of credentials and UE identifiers. Accordingly, the uncrewed vehicle may comprise separate URSPs, SIMs and UELs for each UE. In this respect, it is noted that any reference to the uncrewed vehicle having dual connectivity or two instances of respective functionality (e.g., two radios, acting as two Ues) may also apply to multi-connectivity or to more than two instances of the respective functionality.

In general, the connectivity control function may be configured to determine how to optimally make use of multiple available wireless networks to provide optimal connectivity for the control data connection of the uncrewed vehicle. This optimality may be in terms of quality-of-service but may alternatively or additionally take other aspects into account, such as the cost of a data connection via a particular wireless network (which cost may be different from wireless network to wireless network) and whether a wireless network is of a preferred network provider or not (use of a network of a preferred network provider may be more optimal, for example in terms of cost or process arrangements).

Figure 4:
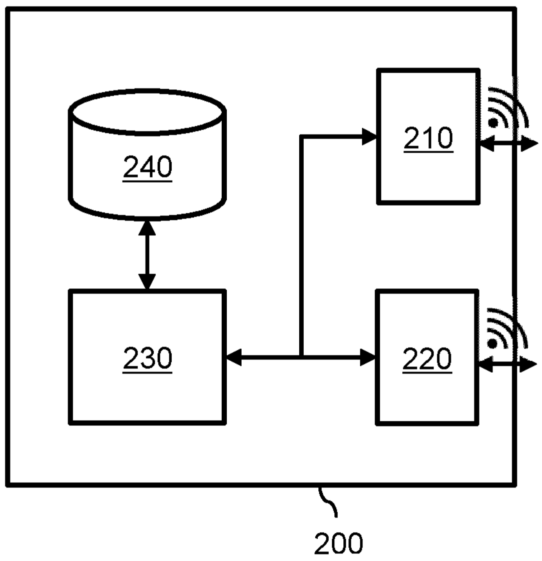
FIG. 4 shows an uncrewed vehicle which comprises two radios for establishing simultaneous network connections to at least two mobile networks.

FIG. 4 shows a block diagram showing select parts of an uncrewed vehicle 200. By way of example, the uncrewed vehicle 200 is shown to comprise a first radio 210 and a second radio 220 for simultaneously connecting to two mobile networks. The radio(s) may be part of, or together form, a network interface subsystem of the uncrewed vehicle 200. Each of the radios may for example be a 5G or next-gen ('6G', etc.) radio for connecting to a 5G or next-gen mobile network adhering to one or more 3GPP standards. In a typical embodiment, both radios may be of a same type (e.g., a same type of 5G radio), but both radios may also be of different types. Although not shown explicitly in FIG. 4, the uncrewed vehicle 200 may also comprise an antenna or antenna connection for each radio. As elucidated elsewhere, in some embodiments, the uncrewed vehicle may also comprise one radio which is capable of multi-connectivity/registration with multiple mobile networks, while in other embodiments, the radio(s) may not be for a mobile network but for another type of wireless network.

The uncrewed vehicle 200 may further comprise a processor subsystem 230 which may be configured, e.g., by hardware design or software, to perform the operations described in this specification in as far as pertaining to the uncrewed vehicle 200. In general, the processor subsystem 230 may be embodied by a single Central Processing Unit (CPU), such as a x86 or ARM-based CPU, but also by a combination or system of such CPUs and/or other types of processors. The uncrewed vehicle 200 is further shown to comprise a data storage 240 which may for example comprise volatile random-access memory or non-volatile solid-state memory, which may be used by the uncrewed vehicle 200 to store data, for example to store data to be sent to, or received from, the connectivity control function and/or the navigational control system.

In general, the uncrewed vehicle 200 may be an uncrewed aerial vehicle such as a drone, or an uncrewed ground-based vehicle, such as an uncrewed bus or car, or an uncrewed space vehicle, or an uncrewed naval or underwater vehicle, etc.

Figure 5:
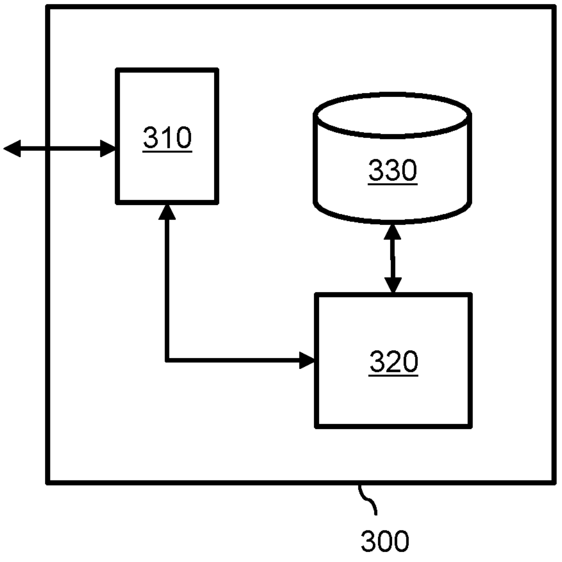
FIG. 5 shows a processor system representing a connectivity control function configured to control the network connectivity of the uncrewed vehicle.

FIG. 5 shows a processor system 300 representing a connectivity control function configured to control the network connectivity of the uncrewed vehicle. In other words, the processor system 300 may be configured to provide an instance of the connectivity control function described in this specification, meaning that the processor system 300 may implement such a connectivity control function. The processor system 300 may comprise a network interface 310 for data communication with a mobile network and with entities associated with the mobile network, such as network functions in the mobile network. The network interface 310 may for example be a wired communication interface, such as an Ethernet or fiber-optic based interface, to a fixed (e.g., non-mobile) part of the mobile network. Alternatively, the network interface 310 may be a wireless communication interface, e.g., being of a type as described for the uncrewed vehicle 200 of FIG. 4. In yet other examples, the processor system 300 may be a subsystem of a larger system, e.g., a supra-system implementing several network functions. In such cases, the network interface 310 may be an internal interface of the supra-system, for example a virtual, software-based network interface.

The processor system 300 may further comprise a processor subsystem 320 which may be configured, e.g., by hardware design or software, to perform the operations described in this specification in as far as pertaining to the entity that the processor system is embodying, e.g., the connectivity control function. In general, the processor subsystem 320 may be embodied by a single Central Processing Unit (CPU), such as a x86 or ARM-based CPU, but also by a combination or system of such CPUs and/or other types of processors. In embodiments where the processor system 300 is distributed over different entities, e.g., over different servers, the processor subsystem 320 may also be distributed, e.g., over the CPUs or other processors of such different servers. As also shown in FIG. 5, the processor system 300 may comprise a data storage 330, such as a hard drive, a solid-state drive, or an array of such hard and/or solid-state drives, etc., which may be used to store data. In some examples, the processor system 300 may be implemented by a network node, or by a system of network nodes jointly implementing the connectivity control function.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

Figure 6:
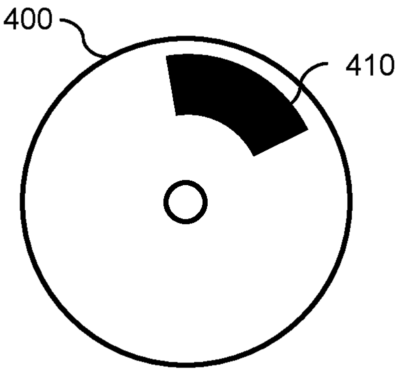
FIG. 6 shows a non-transitory computer-readable medium comprising data.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 400 as for example shown in FIG. 6, e.g., in the form of a series 410 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 6 shows by way of example an optical storage device 400.

Figure 7:
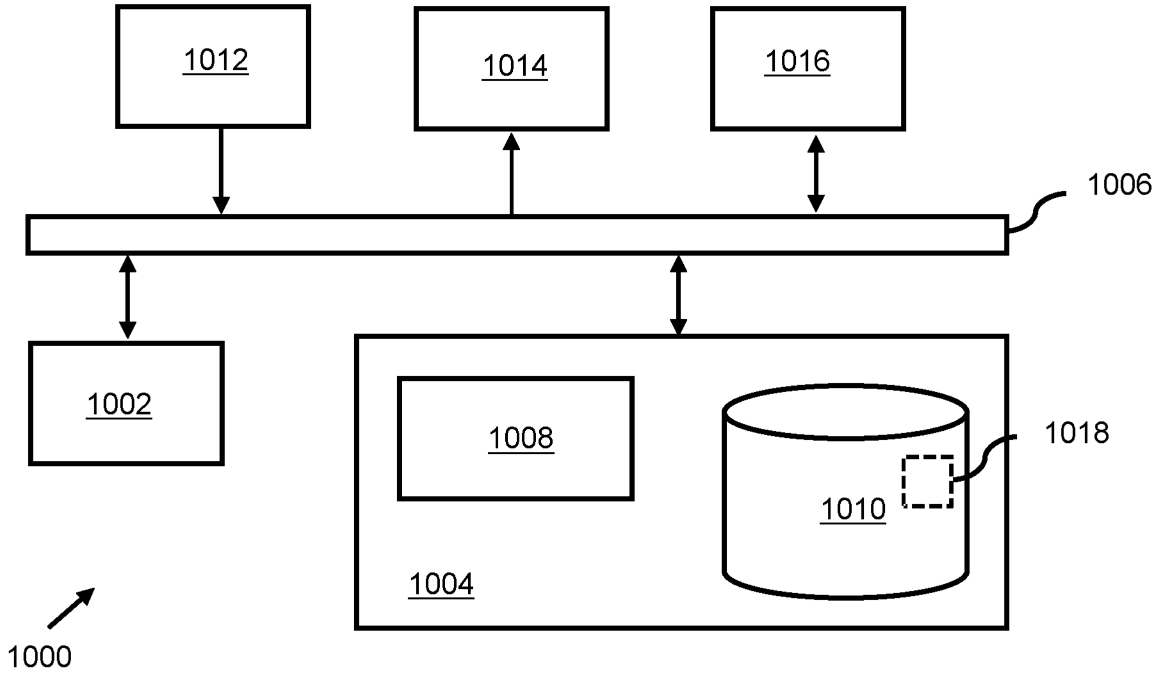
FIG. 7 shows an exemplary data processing system.

FIG. 7 is a block diagram illustrating an exemplary data processing system 1000 that may be used in the embodiments described in this specification. Such data processing systems include data processing entities described in this specification, including but not limited to the uncrewed vehicle and any network node or system of network nodes. The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Radios, modems, cable modems, and ethernet cards are examples of different types of network adapter that may be used with data processing system 1000.

As shown in FIG. 7, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent or be part of an uncrewed vehicle as described in this specification. In that case, application 1018 may represent an application that, when executed, configures data processing system 1000 to perform the functions described with reference to the uncrewed vehicle. In another example, data processing system 1000 may represent an embodiment of a connectivity control function as described in this specification. In that case, application 1018 may represent an application that, when executed, configures data processing system 1000 to perform the functions described with reference to the connectivity control function.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An uncrewed vehicle comprising:

a network interface subsystem configured to establish simultaneous signaling data connections to at least a first wireless network and a second wireless network;

a processor subsystem configured to:

via the first wireless network, establish a control data connection to a navigational control system, wherein the navigational control system is configured to provide navigation instructions to the uncrewed vehicle via the control data connection;

establish via the first wireless network a first signaling data connection to a connectivity control function, and via the second wireless network a second signaling data connection to the connectivity control function, wherein the connectivity control function is configured to control network connectivity of the uncrewed vehicle;

wherein the processor subsystem is further configured to:

via at least one of the first signaling data connection and the second signaling data connection, receive a connectivity control instruction from the connectivity control function; and if the connectivity control instruction is to switch the control data connection to the second wireless network, effect the switch of the control data connection to the second wireless network.

2. The uncrewed vehicle according to claim 1, wherein the processor subsystem is configured to send data to the connectivity control function, wherein the data is indicative of a quality-of-service which the first wireless network provides or is able to provide in the future for the control data connection.

3. The uncrewed vehicle according to claim 2, wherein the data provided to the connectivity control function comprises one or more of:

positional data indicative of a geolocation of the uncrewed vehicle;

route data indicative of a route or destination of the uncrewed vehicle;

network performance data indicative of a network performance of a part of the first wireless network which is utilized by the control data connection.

4. The uncrewed vehicle according to claim 3, wherein the processor subsystem is configured to obtain the route data from the navigational control system before sending the route data to the connectivity control function.

5. The uncrewed vehicle according to claim 1, wherein the processor subsystem is configured to provide quality-of-service requirement data to the connectivity control function, wherein the quality-of-service requirement data is indicative of a quality-of-service requirement for the control data connection.

6. A network node or system of network nodes for providing a connectivity control function to control network connectivity of an uncrewed vehicle, wherein the uncrewed vehicle is configured to establish simultaneous signaling data connections to at least a first wireless network and a second wireless network and to receive navigation instructions from a navigational control system via a control data connection established via the first wireless network, wherein the network node or system of network nodes comprises:

a network interface to the first wireless network;

a processor subsystem for implementing the connectivity control function, wherein the processor subsystem is configured to:

obtain data indicative of a quality-of-service which the first wireless network provides or is able to provide in the future for the control data connection;

based on the data, determine if the second wireless network is able to provide a better quality-of-service for the control data connection than the first wireless network; and if it is determined that the second wireless network is able to provide the better quality-of-service, send a connectivity control instruction to the uncrewed vehicle via at least one signaling data connection, wherein the connectivity control instruction is to switch the control data connection to the second wireless network.

7. The network node or system of network nodes according to claim 6, wherein the data comprises one or more of:

positional data indicative of a geolocation of the uncrewed vehicle;

coverage data indicative of a network coverage of the first wireless network;

route data indicative of a route or destination of the uncrewed vehicle;

network status data indicative of a network status of a part of the first wireless network which is utilized by the control data connection;

network performance data indicative of a network performance of a part of the first wireless network which is utilized by the control data connection.

8. The network node or system of network nodes according to claim 6, wherein the processor subsystem is configured to:

obtain further data indicative of the quality-of-service which the second wireless network is able to provide for the control data connection;

compare the data and the further data to determine if the second wireless network is able to provide the better quality-of-service for the control data connection than the first wireless network.

9. The network node or system of network nodes according to claim 6, wherein the processor subsystem is configured to obtain the data from at least one of:

the uncrewed vehicle, the navigational control system, and one or more network functions of the first wireless network.

10. The network node or system of network nodes according to claim 6, wherein the first wireless network comprises a plurality of radio access points, wherein the data is specific for and obtainable per radio access point or per network part serving one or more radio access points, and wherein the processor subsystem is configured to obtain the data associated with a radio access point to which the uncrewed vehicle is connected or is expected to connect.

11. A navigational control system configured to navigationally control an uncrewed vehicle by sending navigation instructions via a control data connection to the uncrewed vehicle, wherein the navigational control system comprises a processor subsystem configured to implement a connectivity control function to control network connectivity of the uncrewed vehicle, wherein the uncrewed vehicle is configured to establish simultaneous signaling data connections to at least a first wireless network and a second wireless network and to receive navigation instructions from the navigational control system via the control data connection established via the first wireless network, wherein the processor subsystem is configured to:

obtain data indicative of a quality-of-service which the first wireless network provides or is able to provide in the future for the control data connection;

based on the data, determine if the second wireless network is able to provide a better quality-of-service for the control data connection than the first wireless network; and if it is determined that the second wireless network is able to provide the better quality-of-service, send a connectivity control instruction to the uncrewed vehicle via at least one signaling data connection, wherein the connectivity control instruction is to switch the control data connection to the second wireless network.

12. A computer-implemented method of switching control data connections at an uncrewed vehicle, wherein the uncrewed vehicle is configured to establish simultaneous signaling data connections to at least a first wireless network and a second wireless network, wherein the method comprises:

via the first wireless network, establishing a control data connection to a navigational control system, wherein the navigational control system is configured to provide navigation instructions to the uncrewed vehicle via the control data connection;

establishing via the first wireless network a first signaling data connection to a connectivity control function, and via the second wireless network a second signaling data connection to the connectivity control function wherein the connectivity control function is configured to control network connectivity of the uncrewed vehicle;

via at least one of the first signaling data connection and the second signaling data connection, receiving a connectivity control instruction from the connectivity control function; and if the connectivity control instruction is to switch the control data connection to the second wireless network, effecting the switch of the control data connection to the second wireless network.

13. A computer-implemented method of controlling network connectivity of an uncrewed vehicle, wherein the uncrewed vehicle is configured to establish simultaneous signaling data connections to at least a first wireless network and a second wireless network and to receive navigation instructions from a navigational control system via a control data connection established via the first wireless network, wherein the method comprises:

obtaining data indicative of a quality-of-service which the first wireless network provides or is able to provide in the future for the control data connection;

based on the data, determining if the second wireless network is able to provide a better quality-of-service for the control data connection than the first wireless network; and if it is determined that the second wireless network is able to provide the better quality-of-service, sending a connectivity control instruction to the uncrewed vehicle, wherein the connectivity control instruction is to switch the control data connection to the second wireless network.

14. A non-transitory computer-readable medium comprising data representing a computer program, the computer program comprising instructions for causing a processor system to:

via the first wireless network, establish a control data connection to a navigational control system, wherein the navigational control system is configured to provide navigation instructions to the uncrewed vehicle via the control data connection;

establish via the first wireless network a first signaling data connection to a connectivity control function, and via the second wireless network a second signaling data connection to the connectivity control function wherein the connectivity control function is configured to control network connectivity of the uncrewed vehicle;

via at least one of the first signaling data connection and the second signaling data connection, receive a connectivity control instruction from the connectivity control function; and if the connectivity control instruction is to switch the control data connection to the second wireless network, effect the switch of the control data connection to the second wireless network.

15. A non-transitory computer-readable medium comprising data representing a computer program, the computer program comprising instructions for causing a processor system to:

obtain data indicative of a quality-of-service which the first wireless network provides or is able to provide in the future for the control data connection;

based on the data, determine if the second wireless network is able to provide a better quality-of-service for the control data connection than the first wireless network; and if it is determined that the second wireless network is able to provide the better quality-of-service, send a connectivity control instruction to the uncrewed vehicle, wherein the connectivity control instruction is to switch the control data connection to the second wireless network.

* * * * *